(12) United States Patent
Kruspe et al.

(10) Patent No.: US 6,247,542 B1
(45) Date of Patent: Jun. 19, 2001

(54) NON-ROTATING SENSOR ASSEMBLY FOR MEASUREMENT-WHILE-DRILLING APPLICATIONS

(75) Inventors: Thomas Kruspe, Wienhausen; Volker Krueger, Celle, both of (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/247,340

(22) Filed: Feb. 9, 1999

Related U.S. Application Data

(60) Provisional application No. 60/077,144, filed on Mar. 6, 1998.

(51) Int. Cl.⁷ ...................................................... E21B 47/01
(52) U.S. Cl. ............................................. 175/40; 166/66
(58) Field of Search ............................ 175/40, 230, 320; 166/66, 100, 113; 324/303, 356, 369

(56) References Cited

U.S. PATENT DOCUMENTS

| | | | | |
|---|---|---|---|---|
| 4,765,183 | * | 8/1988 | Leaney et al. | 175/40 |
| 5,048,619 | * | 9/1991 | Leaney et al. | 175/40 |
| 5,181,565 | * | 1/1993 | Czernichow | 166/66 |
| 5,280,243 | | 1/1994 | Miller | 324/303 |
| 5,509,474 | * | 4/1996 | Cooke, Jr. | 166/64 |
| 5,557,201 | | 9/1996 | Kleinberg et al. | 324/303 |
| 5,629,623 | | 5/1997 | Sezginer et al. | 324/303 |
| 5,705,927 | | 1/1998 | Sezginer et al. | 324/303 |
| 5,803,186 | * | 9/1998 | Berger et al. | 175/50 |
| 6,109,372 | * | 8/2000 | Dorel et al. | 175/61 |

* cited by examiner

Primary Examiner—Robert E. Pezzuto
Assistant Examiner—Meredith C. Petravick
(74) Attorney, Agent, or Firm—Madan, Mossman & Sriram, P.C.

(57) ABSTRACT

An MWD method and apparatus for determining parameters of interest in a formation has a sensor assembly mounted on a slidable sleeve slidably coupled to a longitudinal member, such as a section of drill pipe. When the sensor assembly is held in a non-rotating position, for instance for obtaining the measurements, the longitudinal member is free to rotate and continue drilling the borehole, wherein downhole measurements can be obtained with substantially no sensor movement or vibration. This is particularly useful in making NMR measurements due to their susceptibility to errors due caused by tool vibration. In addition, the substantially non-rotating arrangement of sensors makes it possible to efficiently carry out VSPs, reverse VSPs and looking ahead of the drill bit. A clamping device is used, for instance, to hold the sensor assembly is held in the non-rotating position. The sensor assembly of the present invention can include any of a variety of sensors and/or transmitters for determining a plurality of parameters of interest including, for example, nuclear magnetic resonance measurements.

58 Claims, 11 Drawing Sheets

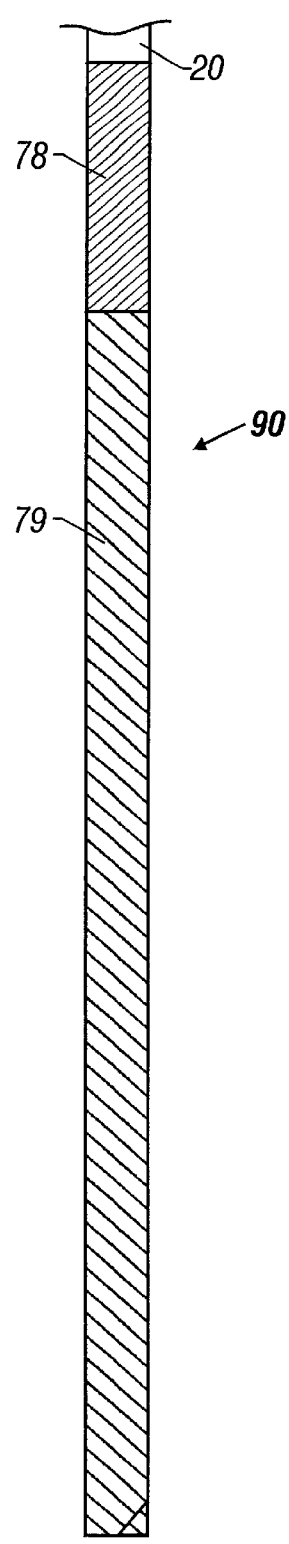
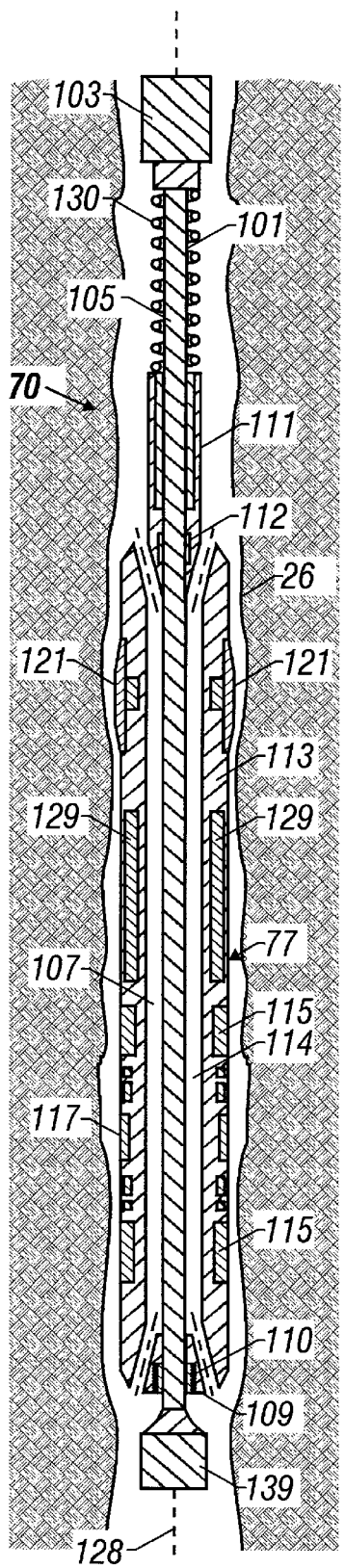
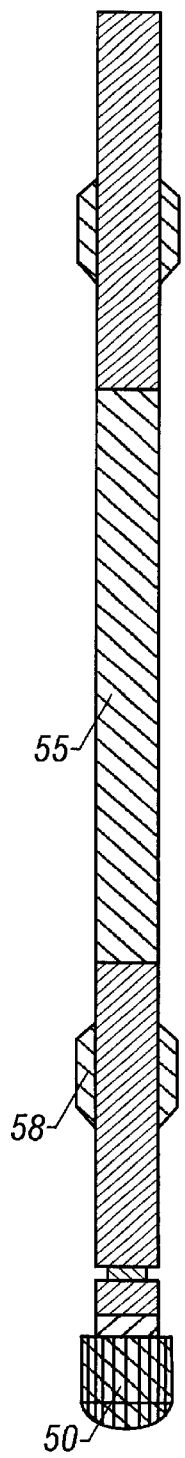
*FIG. 2A*       *FIG. 2B*       *FIG. 2C*

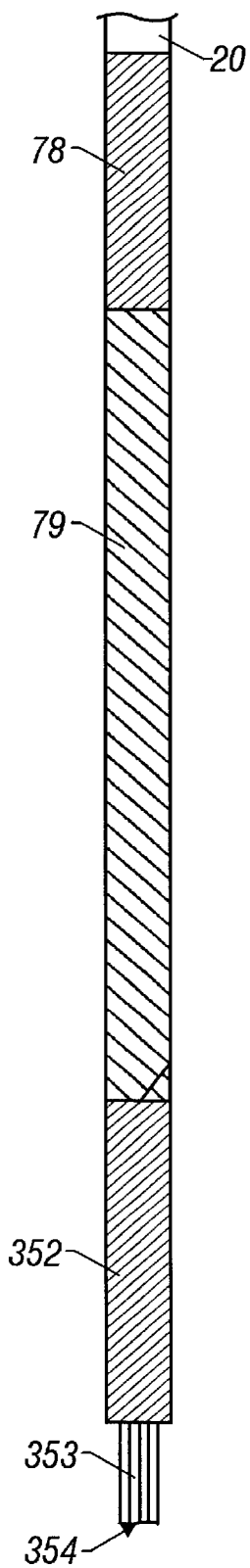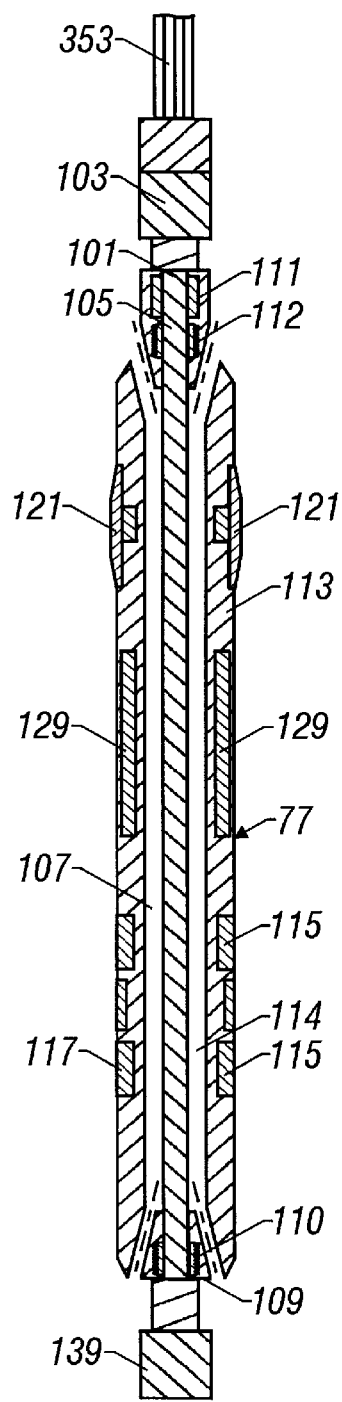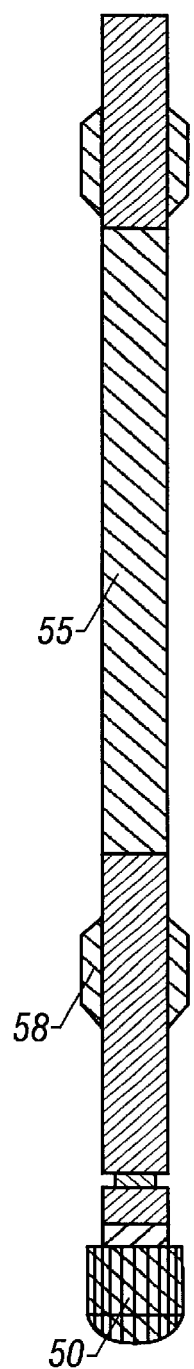
*FIG. 10A*   *FIG. 10B*   *FIG. 10C*

US 6,247,542 B1

NON-ROTATING SENSOR ASSEMBLY FOR MEASUREMENT-WHILE-DRILLING APPLICATIONS

CROSS REFERENCES TO RELATED APPLICATIONS

This application takes priority from Provisional United States Patent Application Ser. No. 60/077,144 filed on Mar. 6, 1998.

FIELD OF THE INVENTION

This invention relates to the acquisition and processing of data acquired by a measurement-while-drilling (MWD) tool during the drilling of a wellbore. More particularly, the invention relates to methods and devices for acquiring data downhole using a tool that is adapted to be clamped to the borehole wall during drilling operations.

BACKGROUND OF THE INVENTION

Modem well drilling techniques, particularly those concerned with the drilling of oil and gas wells, involve the use of several different measurement and telemetry systems to provide petrophysical data and data regarding drilling mechanics during the drilling process. Data is acquired by sensors located in the drillstring near the bit and either stored in downhole memory or transmitted to the surface using MWD telemetry devices. Prior art discloses the use of downhole devices incorporating resistivity, gravity, magnetic and nuclear magnetic resonance measurements on a rotating drillstring.

Prior art devices are limited to measurement devices that rotate with the drillstring. This is particularly problematic in nuclear magnetic resonance (NMR) measurements where lateral vibrations of a drill collar containing the NMR device would adversely affect an NMR measurement. For example, a lateral, 50 Hz vibration of 1-mm amplitude (100-g acceleration) would disable a typical device with a resonance region of the order of 1 mm. Furthermore, since the drillstring can make anywhere between 0.1 to several rotations in the duration of a pulsed NMR measurement (on the order of 0.01 to 1 second), an NMR device on a drillstring must be rotationally symmetric. Prior art NMR devices in which the static magnetic fields are produced by magnets located in the drilling collar suffer from the additional disadvantage that the resonance region extends into the borehole, as a result of which an electromagnetic signal is produced in the borehole fluid. The resulting electromagnetic signal of the borehole fluid must be canceled because the pulsed NMR device functions by detecting protons in fluids. Typically, a porous rock formation may contain 10% fluid by volume whereas the borehole fluid contains more than 50% fluid and has a high density of protons. As a result of this, the electromagnetic signal of the borehole fluid would dominate any formation signal detected by the pulsed NMR device and a special arrangement is necessary to cancel the borehole fluid signal. The present invention overcomes these inadequacies.

SUMMARY OF THE INVENTION

The present invention is an apparatus and method of determining a parameter of interest of a formation surrounding a borehole while drilling the borehole. In one aspect of the invention, the drill bit is mounted on a rotating drillstring or coiled tubing. The present invention includes a longitudinal member, for example, a segment of drill pipe included in the drillstring and rotating with the drillstring, or a shaft on a downhole directional drilling assembly. A sensor assembly is slidably coupled to the longitudinal member wherein the sensor assembly includes at least one sensor for obtaining measurements relating to the parameter of interest. When the sensor assembly is held in a non-rotating position, for instance, for obtaining the measurements, the longitudinal member is free to rotate and continue drilling the borehole. The sensor assembly is slidably coupled to the longitudinal member using, for example, at least one guide sleeve slidably coupled to the longitudinal member. The sensor assembly further includes, for example, at least one transmitter. The sensor assembly of the present invention can include any of a variety of sensors and/or transmitters for determining a plurality of parameters of interest including, for example, nuclear magnetic resonance measurements.

Returning drilling fluid flows outside the sensor assembly, or alternatively, a flow path between the sensor assembly and the longitudinal member allows for the flow of the drilling fluid. In a number of embodiments, at least one clamping device engages the borehole, when activated, for engaging the borehole walls and holding the sensor assembly in the non-rotating position. When the clamping device is deactivated, the sensor assembly disengages from the borehole and the sensor assembly moves to another location in the borehole wherein the clamping device is activated. The sensor or at least one transmitter can be located in the clamping device to make contact with the borehole wall and lock the sensors in place when the sensor assembly is clamped. The clamping device is hydraulically, mechanically, or electrically activated.

The sensor assembly is held against gravitational pull and provided for axial movement using a support device such as a spring device fixedly attached to the longitudinal member, or a hydraulic cylinder fixedly attached to the longitudinal member. In another embodiment, the present invention includes a belt drive device for holding the sensor assembly in the non-rotational position, and for providing a non-continuous movement of the sensor assembly relative to propagation of the longitudinal member.

In still another embodiment, the sensor assembly further includes a sensor for providing azimuthal measurements and determining a tool face orientation of the sensor assembly, and further including a rotational positioning control device for positioning the sensor assembly to a desired tool face orientation.

In still another embodiment, at least one thruster is connected to the sensor assembly for providing axial decoupling and dampening vibrations to the sensor assembly. At least one knuckle joint can also be connected to the thruster to provide further axial decoupling and dampening.

In another embodiment, the sensor assembly is slidably coupled to the longitudinal member using at least two stabilizers on the drillstring connected to the sensor assembly through at least one shaft. The sensor assembly also includes a clamping device to hold the sensor in the non-rotating position.

In each embodiment, magnetic and inertial sensors can be used to provide information on the orientation of the measurement sensors. A telemetry system, for example, sends information downhole about the depth of the drilling assembly. A microprocessor downhole combines the depth and azimuth information with the measurements made by the rotating sensors, uses redundancy in the data to improve S/N ratio, compresses the data and sends it uphole by a telemetry system or stored downhole for later retrieval.

In another aspect of the invention, the drill bit is driven by a downhole drilling motor. The motor may be on a rotating drillstring or on coil tubing. In any of these arrangements, the parameters of interest include NMR characteristics of the formation, resistivity, density, compressional and shear wave velocity and structure, dipmeter and acoustic porosity.

BRIEF DESCRIPTION OF THE FIGURES

FIGS. 2A–2C are side elevational views partially in cross section (see FIG. 2B) of a drilling assembly including a sensor assembly in accordance with the present invention.

FIGS. 10A–10C are side elevational views partially in cross section (see FIG. 10B) of a drilling assembly including a thruster connected above a sensor assembly in accordance with the present invention.

DETAILED DESCRIPTION OF THE INVENTION

Figure 1:
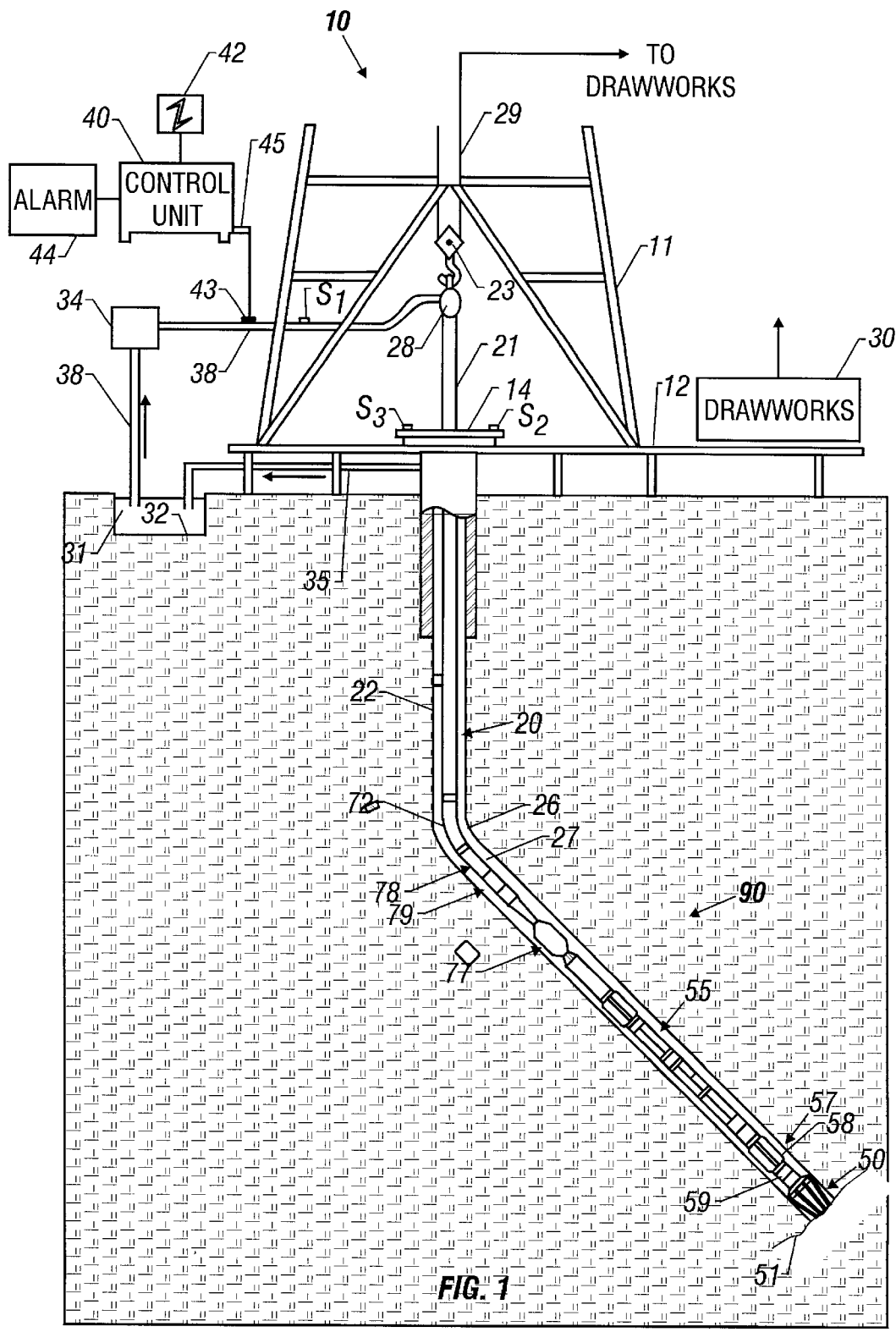
FIG. 1 is a schematic illustration of a drilling system using the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel, 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the preferred embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$–$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

A segment 70 of drill pipe 22, illustrated in greater detail in FIGS. 2–14, illustrates the apparatus and method according to the present invention including a sleeve member, such as a sensor assembly, slidably coupled to a longitudinal member, such as a section of drill pipe, wherein, when the sleeve member is non-rotating, the longitudinal member is free to rotate. The sleeve member may be held in a non-rotating position through engagement with the borehole wall and a decoupling of the sleeve member and the rotating drillstring. The sleeve member including the sensor assembly illustrated in the following FIGS. 2–13 describes a nuclear magnetic resonance device according to the present invention. However, the apparatus and method according to the present invention can be adapted for any MWD device or tool typically used on a rotating drillstring.

Referring to FIGS. 2A–2C, the drilling assembly 90 at the end of the drillstring 20 or coiled tubing is illustrated including the segment 70 of drill pipe 22 according to the present invention. The MWD tool 79, including an associated pulsed NMR tool 77 having a sensor assembly 113, and the pulsed power unit 78 are connected in tandem in the drilling assembly 90. The MWD tool 79 may also include a sonic sensor, a density measurement tool, and a porosity measurement tool. As seen in FIG. 2B, the NMR tool 77 is rotationally symmetric about a longitudinal axis 128 of the drilling assembly 100.

The longitudinal member is, for example, a drill pipe section 101, which forms the core of the segment 70. Alternatively, the longitudinal member is a shaft in a downhole directional drilling assembly. The drill pipe section 101 is connected to the drillstring 20 by the upper tool joint 103 and the lower tool joint 139, and has a channel or flow pass 105 for the drilling mud to flow downhole. The sensor assembly 113 surrounds the drill pipe section 101 and is slidably coupled to the longitudinal member or the drill pipe section 101. The sensor assembly 113 is coupled to the drill pipe section 101 by at least one of guide sleeves 109 and 111.

The guide sleeves 109 and 111 include, for instance, slip rings and bearings 110 and 112, respectively. Alternatively, a single guide sleeve (not shown) including slip rings and bearings, is used, for example, centrally located between ends of the sensor assembly 113. The guide sleeves 109 and 111 allow the sensor assembly 113 to move freely in the axial direction and to a lesser extent laterally with respect to the drill pipe section 101. The sensor assembly 113 has an outer diameter that is somewhat less than the inner diameter of the borehole 26. For illustrative purposes, FIG. 2B shows the space between the sensor assembly 113 and the borehole wall in an exaggerated manner. The NMR sensor assembly includes flow paths 107 and 114 for return flow of the drilling mud from the drilling assembly 90 below wherein the gap between the sensor assembly 113 and the borehole wall are minimized.

The magnet assembly 115, for providing the static magnetic field, and the RF coil assembly 117 are disposed in the sensor assembly 113. The RF coil assembly 117 includes, for instance, at least one transmitter for transmitting a pulsed RF field into the formation. In the configuration as illustrated in FIG. 2B, the RF field is axial and is orthogonal to the static field of the permanent magnet assembly 115 in a region of interest or examination outside the borehole for NMR signal measurements. However, the apparatus of the present invention is not limited to the illustrated sensor assembly 113. Any number of appropriate magnet arrangements and antenna or coil arrangements which provide a static magnetic field and an RF field orthogonal to the static magnetic field direction for creating the region of interest for NMR signal sensitivity can be used according to the present invention. For example, the NMR tool 77 can employ separate transmitter and receiver RF coils, located, for example, on the sensor assembly 113.

Typically, the RF coil assembly 117 is pulsed and creates a high frequency electromagnetic RF field orthogonal to the static magnetic field generated by the magnet assembly 115 and in the region of substantially uniform field strength creating the region or volume of interest for NMR signal sensitivity. The sensor assembly 113 detects the NMR signals resulting therefrom. Rock pores in the earth formations surrounding the wellbore are filled with fluid, typically water or hydrocarbon. The hydrogen nuclei in the fluid are aligned by the region of homogeneous magnetic field, generated by the magnet assembly 115. The hydrogen nuclei are then flipped away from the homogeneous magnetic field by the pulsed RF field produced by RF coil assembly 117. At the termination of the pulsed RF field from RF coil assembly 117, the hydrogen nuclei revolve or precess at high frequency around the homogeneous magnetic field inducing an NMR signal in the RF coil assembly 117 until the hydrogen nuclei relax to the original direction along the homogeneous magnetic field. The induced NMR signals are processed downhole or sent to the surface for processing.

Those versed in the art would recognize that, depending upon the configuration of the permanent magnet assembly 115, the region of examination could have one of a number of configurations. In one embodiment, the region of examination could be substantially toroidal shaped with the axis of the toroid along the longitudinal axis of the tool. In other configurations, the region of examination could be localized on opposite sides of the borehole or even on just one side of the borehole. It will also be clearly apparent to those skilled in the art that the static magnetic field area can also be obtained if the magnet assembly 115 includes dc-energized electromagnets, or superconducting dc electromagnets. All of these are intended to be within the scope of the present invention.

The NMR electronics 129 is housed in the NMR sensor assembly 113. The purpose of the NMR electronics 129 is to control the sensor assembly 113, record, process and transmit the recorded data, to the telemetry module 72. This can be done by means of electrical or acoustic telemetry by known devices and will not be discussed. A spring 130 having a cable conduit through the spring 130 allows power and data transmission via the guide sleeve 111 and slip ring through the cable conduit to and from the MWD tool 79. The MWD tool 79 also transmits data to the sensor assembly 113, for example, through mud pulse telemetry, and provides power from the power unit 78.

The sensor assembly 113 is also provided with at least one clamping pad, clamping piston or ribs 121. The ribs 121 are capable of outward movement for locking the sensor assembly 113 to the borehole wall during measurement by the sensor assembly 113. In one embodiment, the ribs 121 are hydraulically activated. In the inactivated position of the ribs 121, the sensor assembly 113 rests on the lower tool joint 139 and is held up against gravitational pull by the spring 130 that is fixedly attached to the drill pipe section 101. Continued rotation of the drillstring 20 loosely carries the sensor assembly 113 along. In the activated position, the ribs 121 engage the borehole walls and prevent any further movement of the sensor assembly 113. Further rotation of the drillstring 20 does not affect the position of the sensor assembly 113 that remains in a clamped position against the borehole wall. In the clamped position, the sensor assembly 113 is essentially decoupled from rotational and vertical movement of the drillstring 20, enabling measurements, such as NMR measurements from the NMR sensor assembly 113, to be carried out without interference from tool motion and vibration. Due to the proximity of the borehole wall to the magnet assembly 115, the region of examination is within the formation and any signal from the borehole fluid is small.

In another embodiment, at least one sensor of the sensor assembly 113 is located in the at least one clamping pad (not shown) to provide a sensor at the borehole wall when the at least one clamping pad is activated and engaged with the borehole wall. In still another embodiment, at least one transmitter (not shown) is located in the at least one clamping pad to provide a transmitter at the borehole wall when the at least one clamping pad is activated and engaged with the borehole wall.

In typical operation, the NMR measurement takes between 0.01 to 1 second, during which time the drill pipe section 101 advances some distance. Once the NMR measurement has been completed, the ribs 121 are retracted, as a result of which the sensor assembly 113 is no longer coupled to the borehole wall. The sensor assembly 113 then drops down until any further downward motion is stopped by the spring 130. In another embodiment, the ribs 121 are actuated electrically, e.g., by a stepper motor. Other methods, such as those using springs, would be known to those versed in the art.

Figure 3:
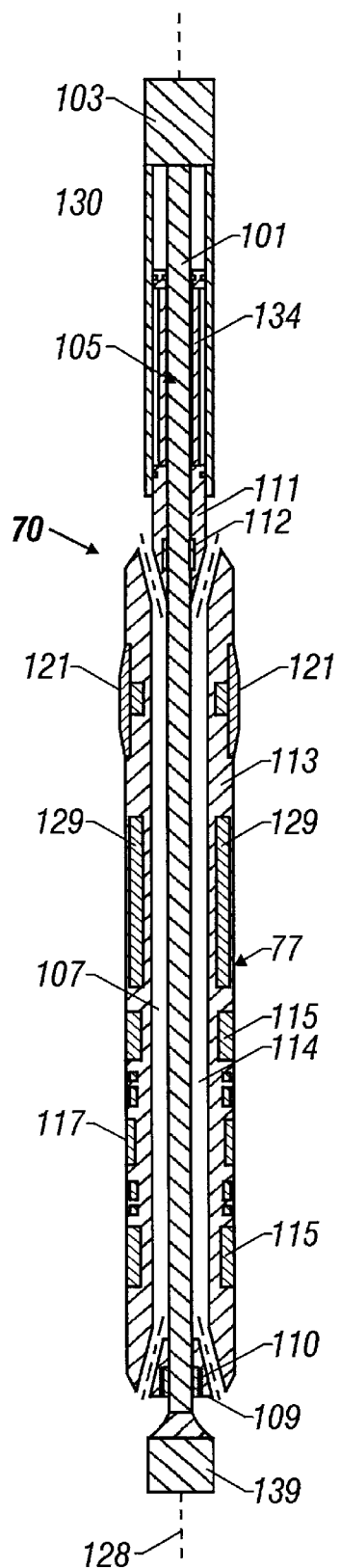
FIG. 3 is a cross sectional view of a sensor assembly in accordance with another embodiment of the present invention.

In the embodiment, shown in FIG. 3, the sensor assembly 113 is held up and activated using a hydraulic cylinder 134 instead of the spring illustrated in FIGS. 2A–2C.

Figure 4:
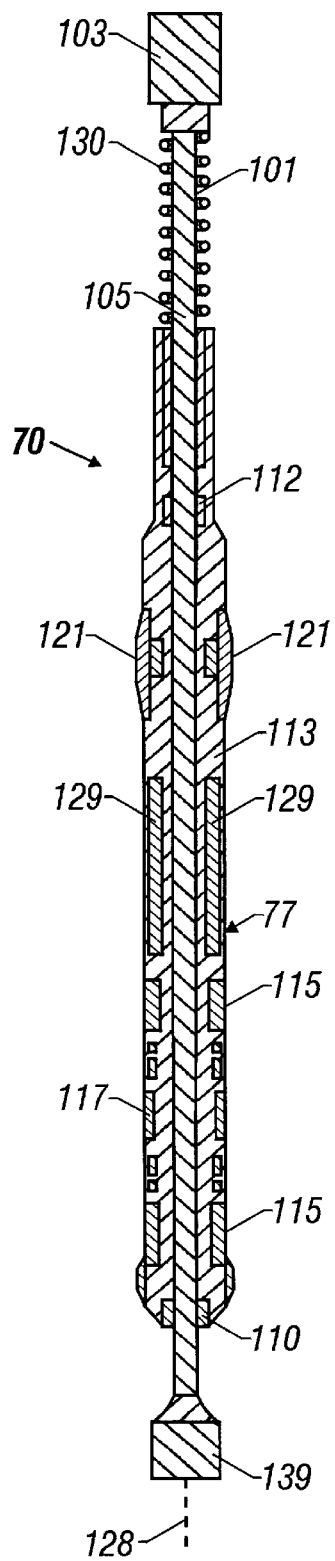
FIG. 4 is a cross sectional view of a sensor assembly in accordance with another embodiment of the present invention.

In an alternative embodiment, shown in FIG. 4, the sensor assembly 113 surrounds the drill pipe section 101 and is slidably coupled to the longitudinal member or the drill pipe section 101 using slip rings and bearings 110 and 112 without the use of separate guide sleeves. When the ribs 121 are in the activated position, the ribs 121 engage the borehole walls and prevent any further movement of the sensor assembly 113. Further rotation of the drillstring 20 does not affect the position of the sensor assembly 113 that remains in a clamped position against the borehole wall. In the clamped position, the sensor assembly 113 is essentially decoupled from rotational and vertical movement of the drillstring 20, enabling measurements, such as NMR measurements from the NMR sensor assembly 113, to be carried out without interference from tool motion and vibration.

The drill pipe section 101 includes the channel or flow pass 105 for the drilling mud to flow downhole, however, in the embodiment illustrated in FIG. 4, the return flow of the drilling mud from the drilling assembly 90 below returns and is guided outside the sensor assembly 113. The embodiment illustrated in FIG. 4 is adaptable for MWD devices, such as the illustrated NMR tool 77, wherein a larger gap between the sensor assembly 113 and the borehole wall is tolerable for formation measurements.

Figure 5:
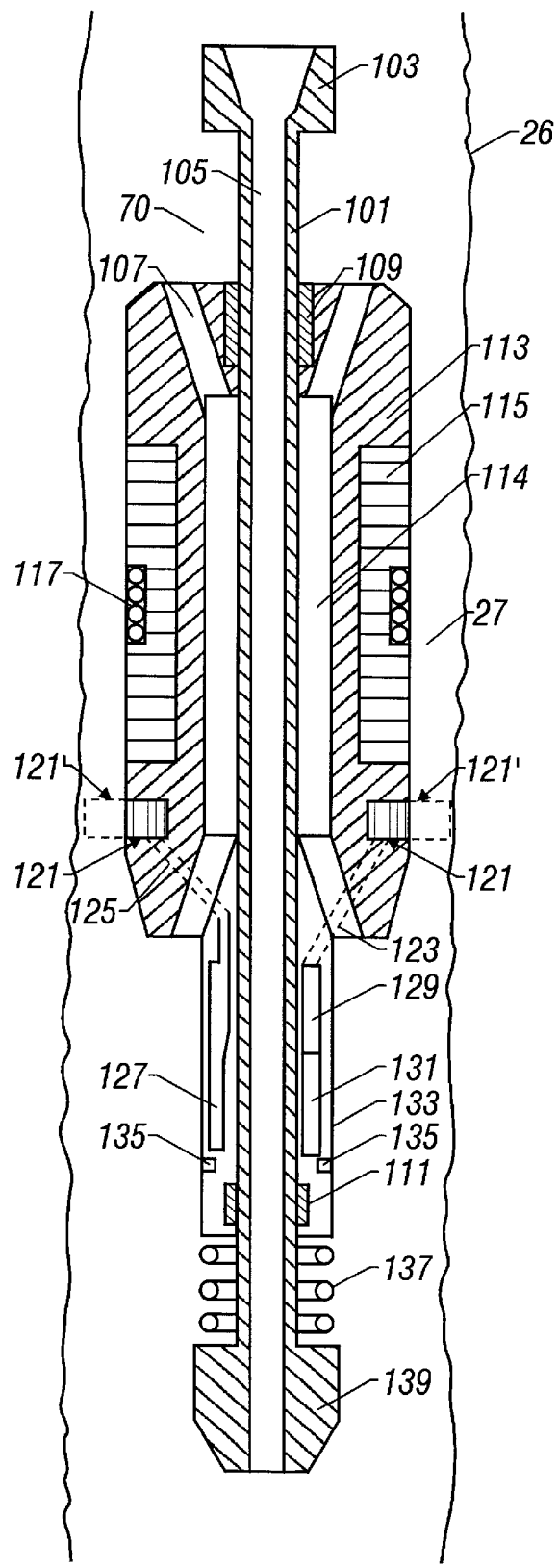
FIG. 5 is a cross sectional view of a sensor assembly in accordance with another embodiment of the present invention.
Figure 6:
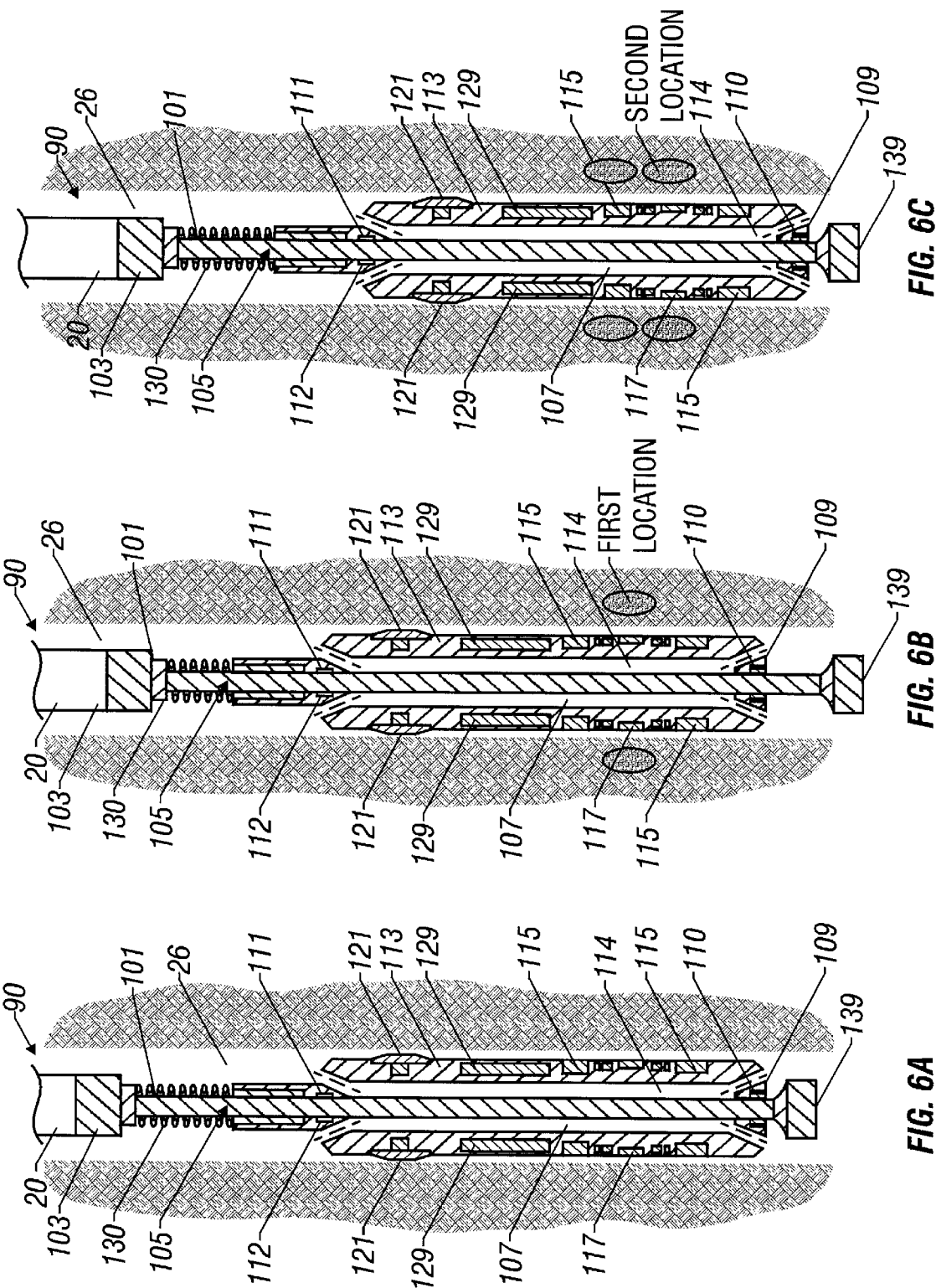
FIGS. 6A–6C are cross sectional views of a drilling assembly including a sensor assembly in accordance with the present invention in a borehole illustrating the operation of the apparatus and method of the present invention.

FIG. 5 illustrates still another embodiment of the apparatus and method of the present invention wherein the NMR electronics 129 and a power supply 131 are housed in a lower part of the sensor assembly 113. The purpose of the NMR electronics 129 is to control the sensor system, record, process and transmit the recorded data, to the telemetry module 72. The RF coil assembly 117 is connected to the NMR electronics 129 by means of the conduit 123 through flow path 114. A pressure barrel 133 in combination with the O- rings 135 seals the NMR electronics 129 and the power supply 131 from the mud. The sensor assembly 113 in FIG. 5 is illustrated with clamping pistons 121 instead of the ribs illustrated in FIGS. 2–4, wherein the clamping pistons 121 are capable of outward movement to the position 121'. The clamping pistons 121 can be activated hydraulically or electrically, for example, under control of the NMR electronics 129. In the inactivated position of the pistons 121, the sensor assembly 113 rests on the springs 137 that are fixedly attached to the lower end of the drill pipe section 101.

Continued rotation of the drillstring loosely carries the sensor assembly 113 along with it. In the activated position 121', the pistons engage the borehole walls and prevent any further movement of the NMR assembly 113. Further rotation of the drillstring does not affect the position of the NMR assembly 113 that remains in a clamped position. In the clamped position, the NMR assembly 113 is essentially decoupled from rotational and vertical movement of the drillstring, enabling NMR measurements to be carried out without interference from tool motion. Once the NMR measurement has been completed, the pistons 121 are retracted, as a result of which the sensor assembly 113 is no longer coupled to the borehole wall. The NMR assembly 113 then drops down until any further downward motion is stopped by the springs 137.

FIGS. 6A–6C illustrate the operation of the sensor assembly 113 slidably coupled to the drill pipe section 101 during a drilling process with continuous propagation of the drillstring 20. In FIG. 6A, the NMR tool 77 is positioned at a first location in the borehole 26. The ribs 121 are in the inactivated position and the sensor assembly 113 rests on the lower guide sleeve 109 and is held up by spring 130 that is fixedly attached to the drill pipe section 101. Continued rotation of the drillstring 20 loosely carries the sensor assembly 113 along.

In FIG. 6B, the sensor assembly 113 is clamped against the borehole wall in the first location in the borehole 26. In the activated position, the ribs 121 engage the borehole walls and prevent any further movement of the sensor assembly 113 such that the sensor assembly 113 is non-rotating and stationary. The drilling assembly 90 continues drilling operations and rotation of the drill bit. Further rotation of the drillstring 20 does not affect the position of the sensor assembly 113 that remains in a clamped position against the borehole wall. In the clamped position, the sensor assembly 113 is essentially decoupled from rotational and vertical movement of the drillstring 20, enabling measurements, such as NMR measurements from the NMR sensor assembly 113, to be carried out without interference from tool motion and vibration. Due to the proximity of the borehole wall to the magnet assembly 115, the region of examination is within the formation and any signal from the borehole fluid is small.

The NMR measurement typically takes between 0.01 second to 1 second, during which time the drill pipe section 101 advances some distance. Once the NMR measurement has been completed, the ribs 121 are retracted, as shown in FIG. 6C, as a result of which the sensor assembly 113 is no longer clamped to the borehole wall. The sensor assembly 113 then drops down until any further downward motion is stopped by the spring 130. The NMR tool 77 is then positioned at a second location in the borehole 26 and the operation is repeated.

Figure 7:
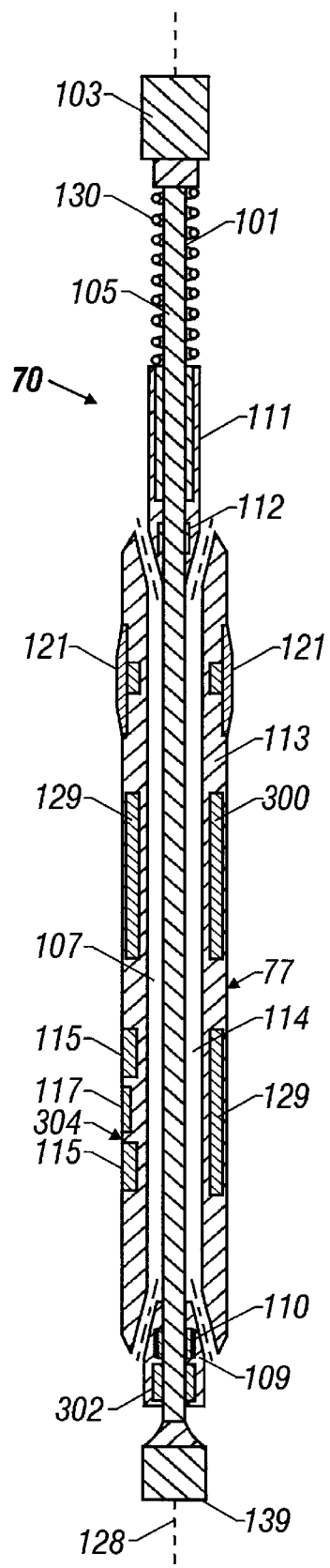
FIG. 7 is a cross sectional view of a sensor assembly in accordance with another embodiment of the present invention including a rotational positioning sensor.

The embodiment illustrated in FIG. 7 further includes a rotational positioning sensor 300 for providing azimuthal measurements and determining tool face 304 orientation and a rotational positioning control 302 device for positioning the sensor assembly 113 to the desired tool face 304 orientation. The sensor assembly 113 is slidably coupled to the longitudinal member or the drill pipe section 101 using the guide sleeves 109 and 111. The guide sleeves 109 further include the rotational positioning control 302 device. The rotational positioning control 302 device includes, for instance, a microprocessor for analyzing azimuthal measurements and the desired tool face 304 orientation. The magnet assembly 115 and RF coil 117 provide an azimuthally focused region of interest for NMR signal sensitivity in front of the magnet assembly 115 and RF coil 117 or tool face 304 of the sensor assembly 113. The non-rotating sensor assembly 113 according to the present invention allows for azimuthal measurements and azimuthally focused tools, such as the NMR tool 77 illustrated, during drilling of the borehole. The apparatus and method of the present invention as shown in FIG. 7 are not limited to the NMR tool 77 shown, and can be used with any MWD device that requires for azimuthal measurements and azimuthally focused measurements.

For example, the rotational positioning sensor 300 provides an azimuthal measurement and determines tool face 304 orientation at a location in the borehole. The rotational positioning control 302 device orients or positions the sensor assembly 113 to the desired tool face 304 orientation for obtaining the region of interest for NMR signal sensitivity in the desired direction from the borehole. The sensor assembly 113 is clamped against the borehole wall when the desired tool face 304 orientation is obtained. During the rotational positioning of the sensor assembly 113, the drilling assembly 90 continues drilling operations and rotation of the drill bit. The magnet assembly 115 and coil assembly 117 limited to the illustrated arrangements, for example, the magnet assembly can include at least three magnets wherein at least two magnets are positioned having like poles facing the formation and at least one centered magnet having a reversed pole positioning for creating a generally radial RF magnetic field and a region of investigation determined by the tool face orientation. Those versed in the art would recognize that, depending upon the configuration of the magnet assembly 115, the region of examination could have one of a number of configurations, for example, the region of examination could be localized on opposite sides of the borehole or on just the one side of the borehole.

Figure 8:
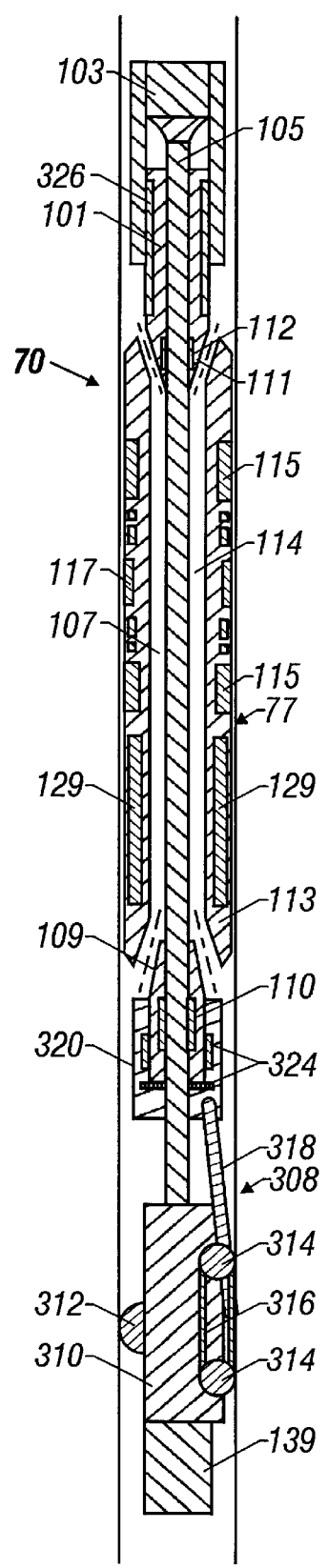
FIG. 8 is a cross sectional view of a sensor assembly in accordance with another embodiment of the present invention including a belt drive device for providing a non continuous movement of the sensor assembly relative to the propagation of the drillstring.

The embodiment illustrated in FIG. 8 further includes a belt drive device 308 for providing a non-continuous movement of the sensor assembly 113 relative to the propagation of the drillstring 20. The belt drive device 308 moves the sensor 113 relative to the propagation of the drillstring 20 in a non-continuous step-movement. The belt drive device 308 includes a sleeve 310, a coupling 320 between rotating and non-rotating sections, at least one counterwheel 312, one or more belt pulleys 314, a belt 316, and a connecting rod 318. The sleeve 310 is slidably coupled to the rotating section of the drillstring 20 and is pulled along with the propagation of the drillstring 20 by the counterwheel 312, which is engaged with the borehole wall during drilling operations. The belt pulleys 314 and the belt 316 are connected to the sleeve 310 and form a belt drive driven by wheels engaged with the borehole wall. The belt pulleys 314 and the belt 316 are connected to the rotating to non-rotating coupling 320 through the connecting rod 318. As the drillstring 20 propagates through the borehole, the belt 316 rotates around the belt pulleys 314 and pull the connecting rod 318 which acts to pull the coupling 320 in a step movement as an end of the connecting rod 318 rotates around the belt pulleys 314 with the belt 316. The rotating to non-rotating coupling 320, including bearings 324, couples the guide sleeve 109 of the sensor assembly 113 to the belt drive device 308 for providing controlled non-continuous movement of the sensor assembly 113 relative to the propagation of the drillstring 20. Those versed in the art would recognize that other arrangements, such as a chain drive, or an electrically operated stepper motor, could also be used to provide the stepping movement. Such alternative arrangements are intended to be within the scope of the present invention.

The sensor assembly 113 is not clamped to the borehole wall in the embodiment shown in FIG. 8. The belt drive device 308 is synchronized with the drillstring 20 such that the belt drive device 308 moves the sensor assembly 113 in a step movement wherein the non-rotating sensor assembly 113 remains stationary for a period of time or drilling distance for obtaining the NMR signal measurements. An inductive coupling 326 or data/power transformer, at guide sleeve 111 provides for the transfer of power and data from the rotating sections to the non-rotating sections.

Figures 9A, 9B, 9C:
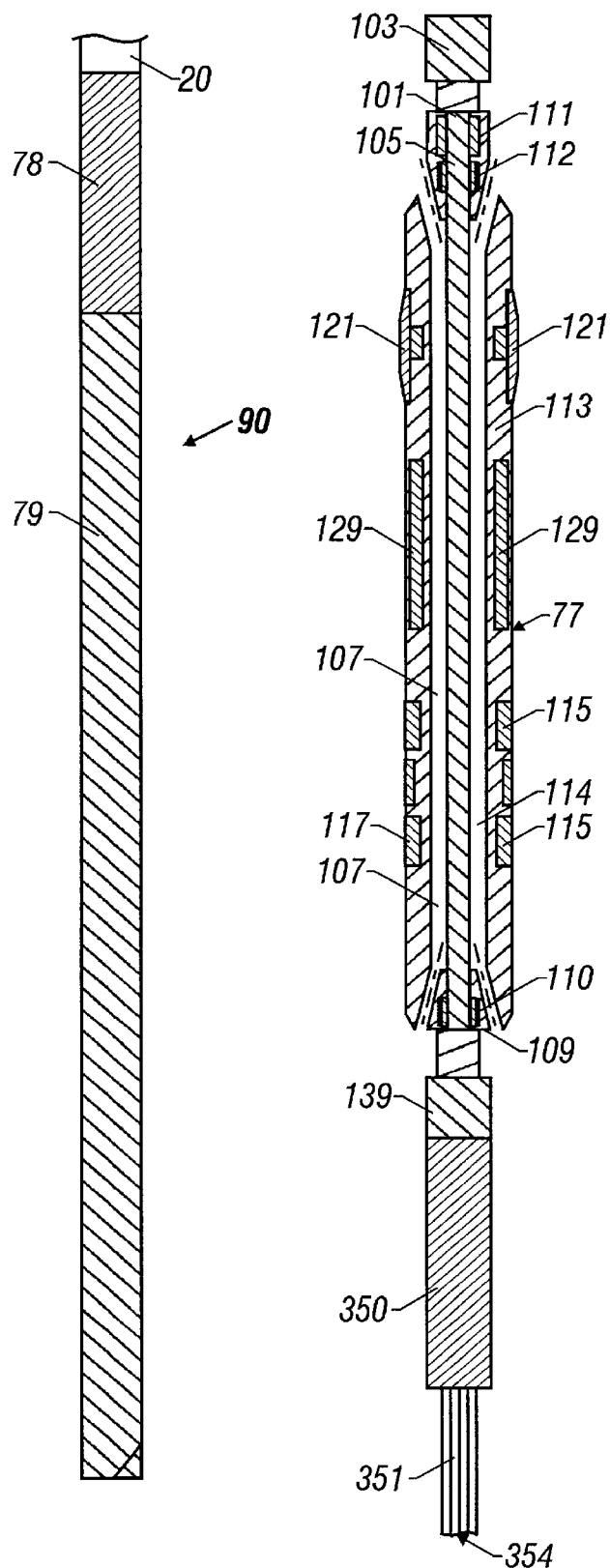
FIGS. 9A–9C are side elevational views partially in cross section (see FIG. 9B) of a drilling assembly including a thruster connected below a sensor assembly in accordance with the present invention.
Figure 11A:
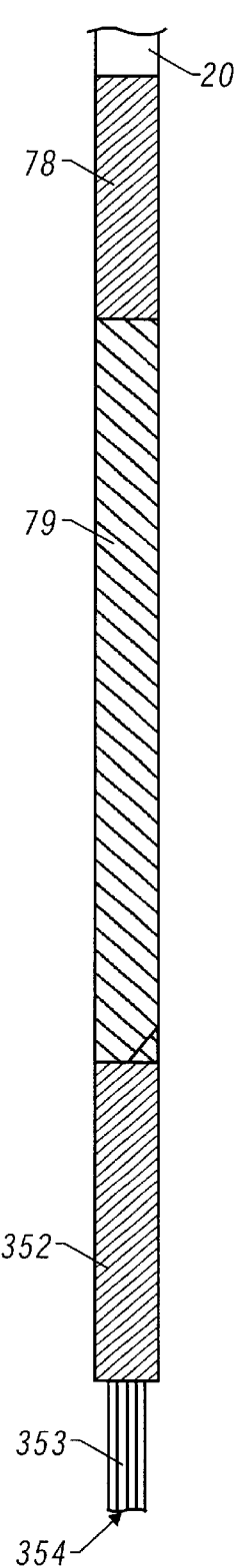
FIGS. 11A–11C are side elevational views partially in cross section (see FIG. 11B) of a drilling assembly including a thruster connected above and a thruster connected below a sensor assembly in accordance with the present invention.
Figure 11B:
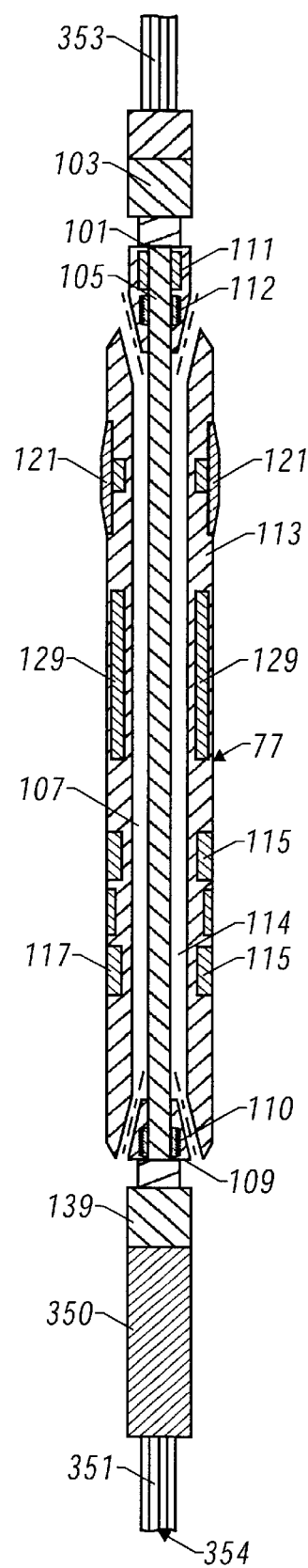
Figure 11C:
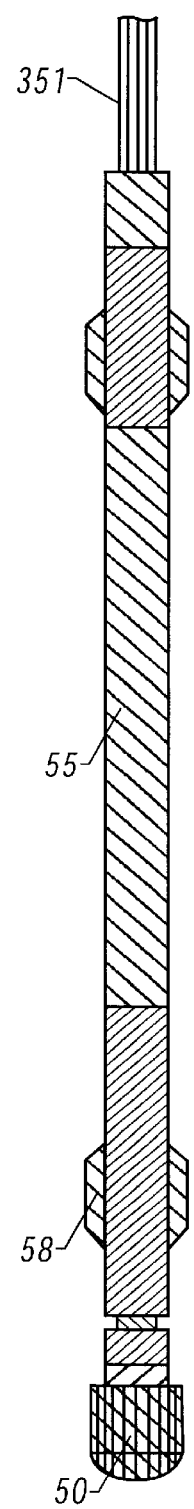
Figure 12A:
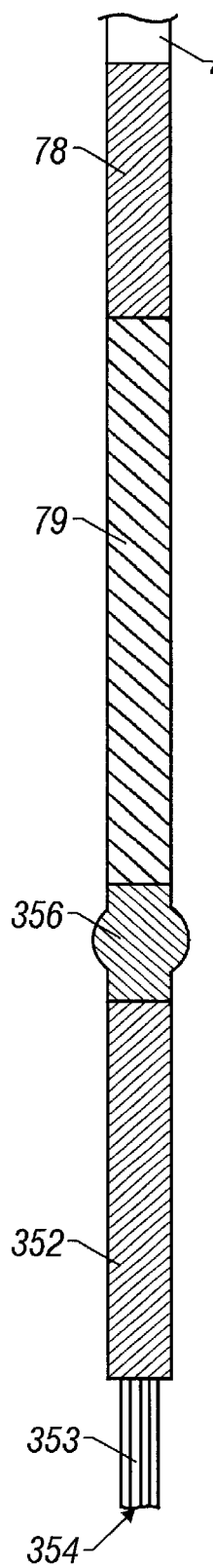
FIGS. 12A–12C are side elevational views partially in cross section (see FIG. 12B) of a drilling assembly including a knuckle joint and a thruster connected above a sensor assembly in accordance with the present invention.
Figure 12B:
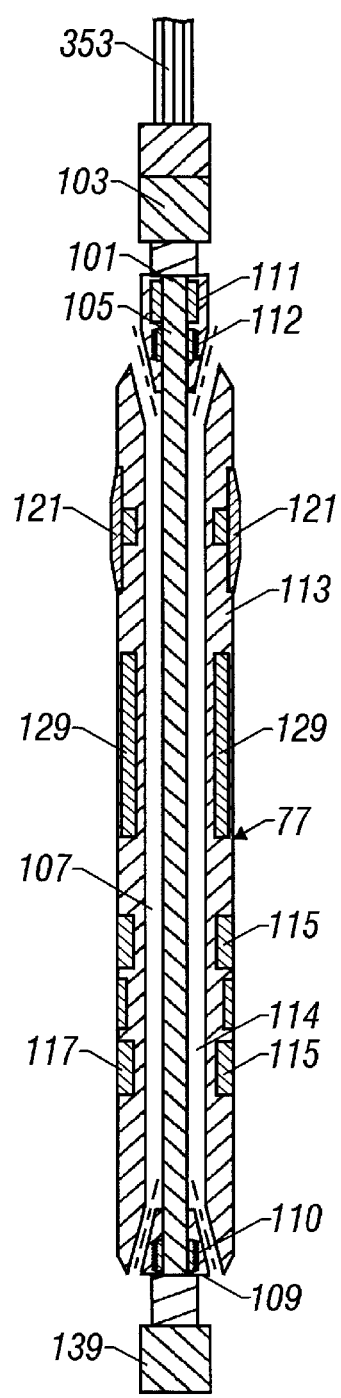
Figure 12C:
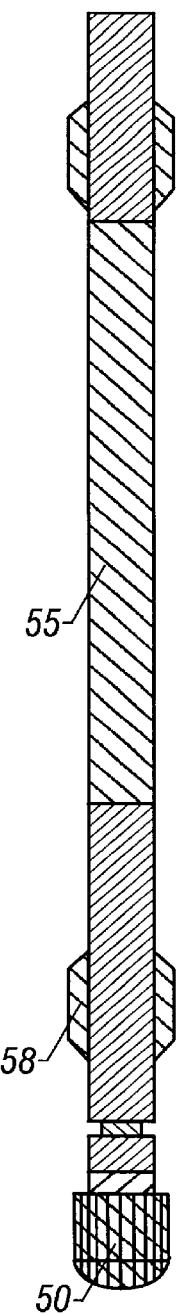

The embodiments illustrated in FIGS. 9A–9C through 12A–12C further include the use of one or more thrusters that provide for axial decoupling of the sensor assembly from the drillstring that acts as a shock absorber or damping means to the drillstring 20 motion and vibrations. Typically, most of the vibrations during drilling operations originate in the drillstring motion rather than the drill bit operation. These embodiments provide the advantages such as independence from rotation and partial isolation from vibrations. FIGS. 9A–9C illustrates the use of a thruster 350 below the drill pipe section 105 with the sensor assembly 113, FIGS. 10A–10C illustrates the use of a thruster 352 above the drill pipe section 105 with the sensor assembly 113, FIGS. 11A–11C illustrates the use of both the thruster 352 above and the thruster 352 below the drill pipe section 105 with the sensor assembly 113, and FIGS. 12A–12C illustrate the use of the thruster 352 above the drill pipe section 105 with the sensor assembly 113 and further including a knuckle joint 356 connected to the thruster 352.

Referring to FIGS. 9A–9C, the drilling assembly 90 at the end of the drillstring 20 is illustrated including the drill pipe section 101 that forms the core of the segment 70 of the drill pipe 22 according to the present invention and further including a thruster 350 positioned below the sensor assembly 113. The MWD tool 79, including the associated pulsed NMR tool 77 are connected in tandem in the drilling assembly 90. The thruster 350 is positioned below the sensor assembly 113 and includes a thruster spline 351 for connecting the thruster 350 to the drillstring 20 and drill pipe section 101. The thruster spline 351 includes a flow path 354 through which the drilling fluid flows. When positioned below the sensor assembly 113, the thruster 350 provides weight-on-bit (WOB) and rate-of-penetration (ROP) movement while the sensor assembly 113 is clamped to the borehole wall for measurements. The thruster 350, when positioned below the sensor assembly 113, also decouples the sensor assembly 113 from the vibrations of the drill bit 50 and acts as a shock absorber to the vibrations of the drill bit 50.

Referring to FIGS. 10A–10C, the thruster 352 is shown positioned above the sensor assembly 113 and includes a thruster spline 353 for connecting the thruster 352 to the drillstring 20 and drill pipe section 101. Most of the vibrations affecting measurement sensors during drilling operations originate in the drillstring motion rather than the drill bit operation. When the thruster 352 is positioned above the sensor assembly 113, the thruster 352 isolates the sensor assembly 113 from the vibrations of the drilling assembly 90 and acts as a shock absorber to the vibrations of the drilling assembly 90.

In a preferred embodiment illustrated in FIGS. 11A–11C, both the thruster 352 positioned above the sensor assembly 113 and the thruster 352 positioned below the sensor assembly 113 are used to provide isolation from both the drill bit 50 below and the drilling assembly 90 above. Preferably, the upper thruster 352 is stronger than the lower thruster 350 that provides a smoother and less risky operation of the thrusters. The lower thruster 350 and the upper thruster 352 are synchronized such that, when the lower thruster 350 is fully extended and the upper thruster 352 is contracted or collapsed, the sensor assembly 113 is clamped to the borehole wall. While the sensor assembly 113 is clamped to the borehole wall, the lower thruster 350 provides WOB and the upper thruster 352 provides for a continuous feeding of the drillstring 20, and both thrusters 350 and 352, respectively, act as shock absorbers to dampen the vibrations from the drill bit 50 below and the drilling assembly 90 motion above. When the sensor assembly 113 is open or not clamped to the borehole wall, the lower thruster 350 contracts or collapses, and the upper thruster 352 expands until fully extended.

FIGS. 12A–12C further illustrate the knuckle joint 356 connected to the upper thruster 352 for providing further vibration isolation and bending decoupling between the drillstring 20 and MWD tools 79 and the sensor assembly 113. In an additional embodiment, the lower thruster (not shown) can also be used in the embodiment illustrated in FIGS. 12A–12C for optimum vibration isolation and damping.

Figure 13:
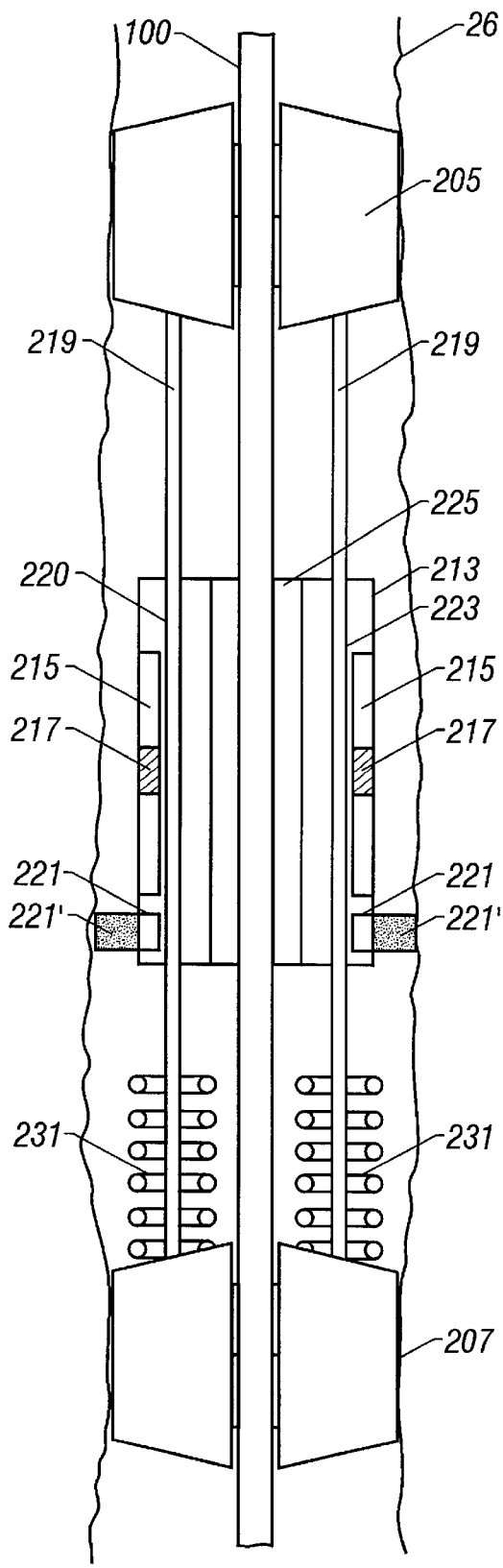
FIG. 13 is a cross sectional view of a sensor assembly and stabilizers in accordance with another embodiment of the present invention.

FIG. 13 shows an alternate arrangement of an NMR assembly 213 that provides for even greater isolation of the NMR tool and sensor assembly 213 from vibrations. Shown is the drill pipe section 101 with a set of upper and lower stabilizers 205 and 207, respectively. The stabilizers 205 and 207 do not rotate as the drill pipe section 101 is rotated. Shafts 219 connected between the upper and lower stabilizers 205 and 207, respectively, pass through longitudinal holes 220 in the NMR sensor assembly 213 and provide lateral support to the NMR sensor assembly 213 while, at the same time, maintaining a gap 225 between the drill pipe section 101 and the sensor assembly 213. The purpose of the gap 225 is to allow space for the return flow of the drilling mud. The sensor assembly 213 is provided, for example, with permanent magnets 215, an RF coil 217 and clamping pistons 221. For the sake of clarity, the hydraulics and electronics inside the NMR assembly are not shown in FIG. 13. When the pistons 221 are activated, they engage the walls of the borehole 26 and lock the sensor assembly 213 in place for making measurements. As the drill pipe section 101 advances, the stabilizers 205 and 207 advance along with the drill pipe section 101 while the sensor assembly 213 remains locked in place. Upon retraction of the pistons 221, the sensor assembly 213 drops down until further motion is stopped by support springs 231. In an alternate configuration, the support springs can be arranged as a single spring surrounding the axis of the drill pipe section 101 (not shown this figure).

The gap between the sensor assembly 213 and the borehole wall in FIG. 13 is exaggerated to show the operation of the pistons. In reality, with a small gap, the sensor assembly 213 is relatively close to the borehole wall. Due to the proximity of the borehole wall to the magnet assembly 215, the region of examination is within the formation and any signal from the borehole fluid is small. Furthermore, the vibration of the NMR sensor assembly 213 is minimal due to the positioning of the sensor assembly 213 between the stabilizers 205 and 207 on the drill pipe section 101.

Figure 14:
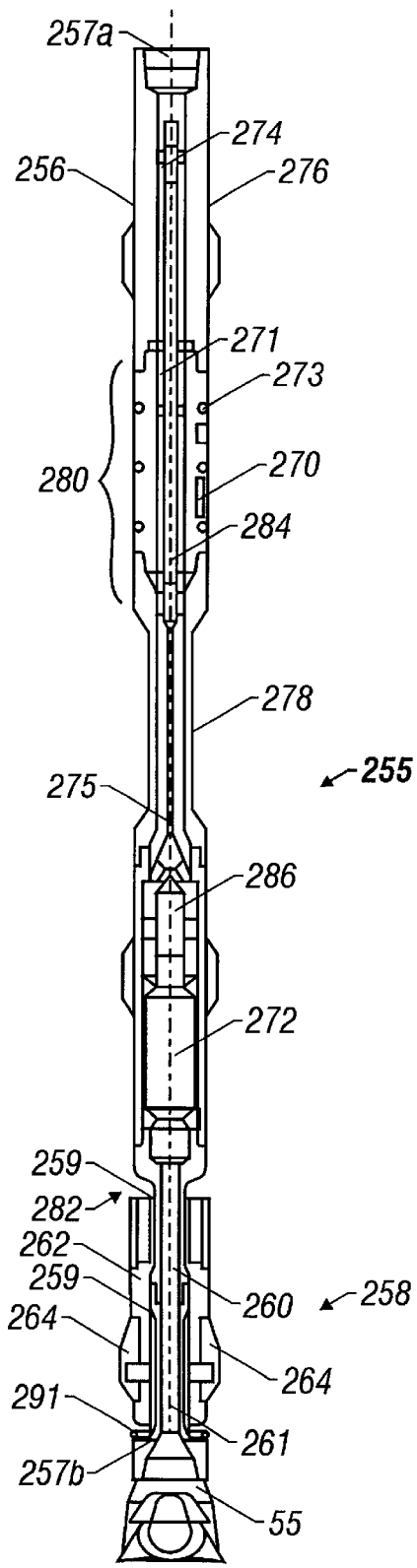
FIG. 14 is a cross sectional view of a drilling assembly in accordance with the present invention for use with a surface rotary system for drilling boreholes wherein the drilling assembly is designed for effecting directional changes downhole.

It is common in drilling operations to provide for changes in the direction of drilling of the borehole. FIG. 14 illustrates a schematic diagram of a rotary drilling assembly 255 conveyable downhole by a drill pipe (not shown) that includes a device for changing drilling direction without stopping the drilling operations for use in the drilling system 10 shown in FIG. 1. The drilling assembly 255 has an outer housing 256 with an upper joint 257a for connection to the drill pipe (not shown) and a lower joint 257b for accommodating the drill bit 55. During drilling operations, the housing, and thus the drill bit 55, rotate when the drill pipe is rotated by the rotary table at the surface. Alternatively, the drill bit could be driven by a mud motor. The lower end 258 of the housing 256 has a reduced outer dimension and a bore 259 therethrough. The reduced-dimensioned lower end 258 includes a shaft 260 connected to the lower joint 257b with a passage 261 for allowing the drilling fluid to pass to the drill bit 55. A sliding sleeve sensor assembly 262 is disposed on the outside of the reduced dimensioned lower end 258, such that when the housing 256 is rotated to rotate the drill bit 55, the sensor assembly 262 is substantially non-rotating. As indicated in FIG. 14, the length of the sensor assembly 262 is such as to provide a gap allowing for axial motion of the sensor assembly 262 relative to the housing 256. In FIG. 14, a gap 282 is shown at the upper end of the sensor assembly 262.

A plurality of independently adjustable or expandable pads 264 are disposed on the outside of the sensor assembly 262. Each pad 264 is preferably hydraulically operated by a control unit in the drilling assembly 256. Each pad 264, when extended, exerts a force so as to lock the sensor assembly 262 in place with the borehole wall. When the pads 264 are articulated to lock the sensor assembly 262 in place, measurements are taken relating to the parameters of interest. The housing 256 and the drill bit 55 continue to advance while the sensor assembly stays locked in position due to the sliding sleeve arrangement. After the measurements have been taken, the pads 264 are retracted and the sensor assembly 262 moves down through gravity, wherein the motion of the sensor assembly 262 is buffered by spring 291. Mechanisms for extending the pads to make contact could be operated by hydraulic, mechanical or electrical devices. The force exerted by the different pads can be independently adjustable so as to minimize vibration of the sensor assembly.

The drilling assembly also includes a directional sensor 271 and sensors for determining the temperature, pressure, fluid flow rate, weight on bit, rotational speed of the drill bit, radial and axial vibrations, shock and whirl. Without limiting the scope of the invention, the directional sensor 271 could be of the magnetic or inertial type. The drilling assembly 255 preferably includes a number of nonmagnetic stabilizers 276 near the upper joint 257a for providing lateral or radial stability to the drillstring during drilling operations. A flexible joint 278 is disposed between the section 280 and the reduced dimensioned lower end 258 section containing the sensor assembly 262. A control unit 284 includes a control circuit or circuits having one or more processors. A telemetry device, in the form of an electromagnetic device, an acoustic device, a mud-pulse device or any other suitable device, generally designated herein by 286 is disposed in the drilling assembly at a suitable location. A microprocessor 272 is also disposed in the drilling assembly at a suitable location.

Another method for directional drilling of wellbores uses a downhole drilling assembly mounted at the end of coil tubing. The coil tubing provides a flow of mud that powers the drilling motor and electrical sources within the drilling assembly. The drilling assembly of FIG. 14 could also be used in conjunction with coil tubing with minor modifications known to those versed in the art. The sliding sleeve including the sensor assembly 262 is clamped to the borehole wall for limited periods of time while measurements are being taken. In one embodiment, sensors are mounted on the pads 264 (in which case the sensors make contact with the formation) or, in another embodiment, the sensors are deployed on the sensor assembly 262 provided with pistons or ribs for clamping to the borehole wall.

The sensor assemblies discussed above with reference to FIGS. 2–14 are NMR sensors. With minor modifications that would be known to those versed in the art, other sensors could be used in these configurations. For example, any sensors that do not require actual contact between the sensor and the borehole wall can be used. These include electromagnetic induction sensors for determination of the resistivity and dielectric properties of the formation, density and gamma ray sensors, acoustic transducers that form an image of the borehole wall and acoustic transducers that determine compressional and shear velocities of the formation in the vicinity of the borehole. Alternatively, for sensors or transducers that require physical contact between the sensor and the formation, the configurations shown, for example, in FIGS. 2–4, 7, 912 and 14, wherein activated ribs or pads are used for clamping to the borehole wall, the sensors are placed in the ribs or pads. These include electromagnetic induction sensors for determination of the resistivity and dielectric properties of the formation, density and gamma ray sensors, resistivity transducers (such as button electrode arrangements) that form a resistivity image of the borehole wall, acoustic transducers that determine compressional and shear velocities of the formation in the vicinity of the borehole, and acoustic transducers (including 3-component motion, velocity or acceleration sensors) for use in conducting Vertical Seismic Profiles (VSPs) in a Measurement While Drilling environment. In an alternate embodiment, the acoustic transducers comprise acoustic transmitters (including 3-component transmitters) generating either pulse signals or swept frequency signals suitable for conducting a reverse VSP with recording devices located away from the borehole. With 3-component transmitters, information about the orientation of the transmitters is recorded and available to the processor. The processing of data in a reverse VSP is usually done by a uphole processor. In another embodiment of the sensor, a formation sampling probe is located on the ribs or the pads: these make it possible to obtain samples of the formation fluids during the process of drilling the borehole. In yet another embodiment of the invention, the sensor assembly is provided with sensors for measuring properties of the fluid in the formation, such as fluid pressure, fluid mobility and fluid permeability. Methods of deploying and controlling such sensors downhole would be familiar to those versed in the art and are not discussed here.

In an alternate arrangement (not shown), two sets of axially spaced-apart pads are provided on the sliding sleeve. One set of pads has transmitters on it and the second set of pads has receivers. With 3-component seismic transmitters and receivers, this provides the ability to measure compressional and shear velocities of the formation between the transmitter and the receiver. In particular, because of the ability to directly couple a seismic source to the borehole wall, shear waves of different polarization can be generated and detected. Those versed in the art would know that in an anisotropic formation, two different shear waves with different polarization and velocity can be propagated (called the fast and the slow shear wave). Measurement of the fast and slow shear velocities gives information about fracturing of the formation and would be familiar to those versed in methods of processing the data to obtain this fracturing information.

The same arrangement of having seismic transmitters and receivers at fixed positions makes it possible to record reflections from surfaces in the vicinity of the borehole. In particular, it enables the device to obtain distances to seismic reflectors in the vicinity of the borehole. This information is useful in looking ahead of the drill bit and in guiding the drill bit where it is desired to follow a particular geologic formation.

In another embodiment of the invention (not shown), a linear arrangement of electrodes on a single or two spaced-apart pads is used. Those versed in the art would recognize that by having an arrangement with four electrodes substantially in a linear arrangement in a fixed position, the outer electrodes being a transmitter and a receiver respectively, and by measuring the potential difference between the inner electrodes, a resistivity measurement of the formation can be obtained. Such an arrangement is considered to be conventional in wireline logging applications but has hitherto not been used in measurement-while-drilling applications because of the difficulty in aligning the electrodes on a rotating drillstring.

The foregoing description has been limited to specific embodiments of this invention. It will be apparent, however, that variations and modifications may be made to the disclosed embodiments, with the attainment of some or all of the advantages of the invention. In particular, the invention may be modified to make density and acoustic measurements. Therefore, it is the object of the appended claims to cover all such variations and modifications as come within the true spirit and scope of the invention.

What is claimed is:

1. An apparatus for drilling a borehole and determining a parameter of interest of a formation surrounding the borehole during drilling operations, said apparatus comprising:

a longitudinal member for rotating a drill bit and adapted to be conveyed in the borehole;

a sensor assembly slidably coupled to and spaced apart from said longitudinal member defining a flow path for drilling fluid therebetween, said sensor assembly including at least one sensor for obtaining measurements relating to the parameter of interest; and wherein, when the sensor assembly is held in a non-rotating position, the longitudinal member is free to rotate.

2. The apparatus of claim 1 wherein the sensor assembly further comprises:

at least one clamping device for engaging the borehole to clamp the sensor assembly to the borehole.

3. The apparatus of claim 2 wherein the at least one sensor is located on said at least one clamping device.

4. The apparatus of claim 1 wherein the sensor assembly further comprises at least one transmitter for sending signals into the formation for obtaining information about the parameter of interest.

5. The apparatus of claim 3 further comprising:

at least one transmitter located on said at least one clamping device.

6. The apparatus of claim 1 wherein the sensor assembly is slidably coupled to the longitudinal member using at least one guide sleeve slidably coupled to said longitudinal member.

7. The apparatus of claim 1 wherein the longitudinal member is a segment of drill pipe.

8. The apparatus of claim 1 wherein the longitudinal member is a shaft on a downhole directional drilling assembly.

9. The apparatus of claim 1 wherein the sensor assembly further comprises:

a magnet assembly for providing a static magnetic field in a region of interest in the formation;

at least one transmitter for providing a pulsed radio frequency (RF) magnetic field orthogonal to said static field in the region of interest.

10. The apparatus of claim 9 wherein the RF magnetic field is parallel to said longitudinal member.

11. The apparatus of claim 1 wherein the at least one sensor comprises a sensor for providing azimuthal measurements and determining a tool face orientation of the sensor assembly.

12. The apparatus of claim 11 further comprising:

a rotational positioning control device for positioning the sensor assembly to a desired tool face orientation.

13. The apparatus of claim 1 further comprising:

a support device selected from (i) a spring, and (ii) a hydraulic cylinder, said support device fixedly attached to the longitudinal member for holding the sensor assembly against gravitational pull and for axial movement of the sensor assembly.

14. The apparatus of claim 13 wherein the support device is a spring, the apparatus further comprising:

a conduit through said spring device for providing transfer of data and power to and from the sensor assembly.

15. The apparatus of claim 1 further comprising:

a device for providing a non-continuous movement of the sensor assembly relative to propagation of the longitudinal member.

16. The apparatus of claim 15 wherein the device is selected from (i) a belt drive device, (ii) a chain drive, and (iii) an electrical stepper motor.

17. The apparatus of claim 1 further comprising:

at least one thruster connected to the sensor assembly for providing axial decoupling of the sensor assembly from the longitudinal member and for dampening vibrations to the sensor assembly.

18. The apparatus of claim 17 wherein, when said at least one thruster is connected below the sensor assembly, the at least one thruster provides for weight-on-bit during drilling operations.

19. The apparatus of claim 17 wherein, when said at least one thruster is connected above the sensor assembly, the at least one thruster provides for continuous feeding of a drillstring during drilling operations.

20. The apparatus of claim 17 further comprising:

at least one knuckle joint connected to said at least one thruster for providing further axial decoupling of the sensor assembly from the longitudinal member.

21. The apparatus of claim 1 wherein the sensor assembly is slidably coupled to the longitudinal member using at least two stabilizers slidably coupled to said longitudinal member and connected to said sensor assembly through at least one shaft.

22. The apparatus of claim 1 wherein the apparatus is adapted to be conveyed on a drillstring.

23. The apparatus of claim 1 wherein the apparatus is adapted to be conveyed on a coil tubing.

24. The apparatus of claim 2 wherein the at least one clamping device is selected from the group consisting of: (i) hydraulically operated clamping device, (ii) spring operated clamping device, and (iii) electrically operated clamping device.

25. The apparatus of claim 1 wherein the parameter of interest is selected from the group consisting of: (i) resistivity of the formation, (ii) density of the formation, (iii) compressional wave velocity of the formation, (iv) fast shear wave velocity of the formation, (v) slow shear wave velocity of the formation(vi) dip of the formation, (vii) radioactivity of the formation, (viii) nuclear magnetic resonance characteristic of the formation, (ix) pressure of a fluid in the formation, (x) mobility of a fluid in the formation, and (xi) permeability of the formation to flow of a fluid therein.

26. The apparatus of claim 1 wherein the sensor assembly is adapted to recover a sample of a fluid from the formation.

27. A method for determining a parameter of interest of a formation surrounding a borehole while drilling the borehole, the method comprising conveying a longitudinal member operatively coupled to a drill bit in the borehole;

slidably coupling a sensor assembly to said longitudinal member wherein the sensor assembly includes at least one sensor;

holding the sensor assembly in a non-rotating position while rotating the longitudinal member to drill the borehole;

flowing a drilling fluid through a flow path between the sensor assembly and the longitudinal member; and obtaining measurements relating to the parameter of interest using the at least one sensor.

28. The method of claim 27 wherein the step of holding the sensor assembly in a non-rotating position further comprises:

activating at least one clamping device in the sensor assembly to engage the borehole in a first location in the borehole; and clamping the sensor assembly in said non-rotating position.

29. The method of claim 28 further comprising:
deactivating the at least one clamping device in the sensor assembly to disengage the borehole;
moving the sensor assembly to a second location in the borehole;
activating the at least one clamping device in the sensor assembly to engage the borehole in the second location in the borehole; and
clamping the sensor assembly in said non-rotating position.

30. The method of claim 28 further comprising:
locating the at least one sensor on the at least one clamping device.

31. The method of claim 28 wherein the sensor assembly further includes at least one transmitter and further comprising:
locating the at least one transmitter on the at least one clamping device.

32. The method of claim 28 further comprising:
connecting at least one lower thruster below the sensor assembly;
connecting at least one upper thruster above the sensor assembly;
axially decoupling the sensor assembly from the longitudinal member using said at least one lower thruster and said at least one upper thruster; and
dampening vibrations to the sensor assembly using said at least one lower thruster and said at least one upper thruster.

33. The method of claim 32 further comprising:
extending the at least one lower thruster and contracting the at least one upper thruster when the sensor assembly is clamped in the non-rotating position; and
deactivating the at least one clamping device in the sensor assembly to disengage the borehole; and
contracting the at least one lower thruster and expanding the at least one upper thruster when the sensor assembly is disengage from the borehole.

34. The method of claim 28 wherein the step of activating the at least one clamping device further comprises:
locating a processor in the sensor assembly;
using said processor for activating the clamping device; and
using said processor receiving data from the at least one sensor.

35. The method of claim 28 wherein the at least one clamping device is selected from the group consisting of: (i) hydraulically operated clamping device, (ii) spring operated clamping device, and (iii) electrically operated clamping device.

36. The method of claim 27 further comprising:
(i) using a magnet assembly for providing a static magnetic field in a region of interest in the formation;
(ii) using at least one transmitter for providing a pulsed radio frequency (RF) magnetic field orthogonal to said static field in the region of interest.

37. The method of claim 36 wherein the RF magnetic field is parallel to said longitudinal member.

38. The method of claim 27 wherein the sensor assembly further includes at least one transmitter.

39. The method of claim 27 wherein the step of slidably coupling the sensor assembly to said longitudinal member further comprises:
slidably coupling at least one guide sleeve to said longitudinal member wherein the sensor assembly is slidably coupled to the longitudinal member using said at least one guide sleeve.

40. The method of claim 27 wherein the longitudinal member is a segment of drill pipe.

41. The method of claim 27 wherein the longitudinal member is a shaft on a downhole directional drilling assembly.

42. The method of claim 27 wherein the sensor assembly further includes at least one transmitter and further comprising:
transmitting a radio frequency field into the formation.

43. The method of claim 42 further comprising:
obtaining nuclear magnetic resonance measurements using the at least one sensor.

44. The method of claim 27 further comprising:
obtaining azimuthal measurements using the at least one sensor; and
determining a tool face orientation of the sensor assembly.

45. The method of claim 44 further comprising:
positioning the sensor assembly to a desired tool face orientation using a rotational positioning control device.

46. The method of claim 27 further comprising:
fixedly attaching a support device to the longitudinal member;
holding the sensor assembly against gravitational pull using said spring device; and
providing for axial movement of the sensor assembly using said support device.

47. The method of claim 46 wherein the support device is a spring, the method further comprising:
locating a conduit in said spring device; and
transferring data and power to and from the sensor assembly through said conduit.

48. The method of claim 27 comprising:
fixedly attaching a hydraulic cylinder device to the longitudinal member;
holding the sensor assembly against gravitational pull using said hydraulic cylinder device; and
providing for axial movement of the sensor assembly using said hydraulic cylinder device.

49. The method of claim 27 wherein the step of holding the sensor assembly in a non-rotating position further comprises:
coupling a stepping device selected from the group consisting of (i) a belt drive, (ii) a chain drive, and (iii) a stepping motor, to the sensor assembly the stepping device providing a non-continuous movement of the sensor assembly relative to propagation of the longitudinal member.

50. The method of claim 27 further comprising:
connecting at least one thruster to the sensor assembly;
axially decoupling the sensor assembly from the longitudinal member using said at least one thruster; and
dampening vibrations to the sensor assembly using said at least one thruster.

51. The method of claim 50 wherein the step of connecting at least one thruster to the sensor assembly further comprises:
connecting said at least one thruster below the sensor assembly for providing weight-on-bit while drilling the borehole.

52. The method of claim 50 wherein the step of connecting at least one thruster to the sensor assembly further comprises:

connecting said at least one thruster above the sensor assembly for providing continuous feeding of a drillstring above the sensor assembly while drilling the borehole.

53. The method of claim 50 further comprising:

connecting at least one knuckle joint to said at least one thruster for providing further axial decoupling of the sensor assembly from the longitudinal member.

54. The method of claim 27 wherein the step of slidably coupling the sensor assembly to the longitudinal member further comprises:

slidably coupling at least two stabilizers to said longitudinal member; and connecting at least one shaft from the at least two stabilizers through the sensor assembly wherein the sensor assembly is slidably coupled to the longitudinal member using said at least two stabilizers.

55. The method of claim 27 further comprising:

conveying the longitudinal member on a drillstring.

56. The method of claim 27 further comprising:

conveying the longitudinal member on a coil tubing.

57. The method of claim 27 wherein the parameter of interest is selected from the group consisting of: (i) resistivity of the formation, (ii) density of the formation, (iii) compressional wave velocity of the formation, (iv) fast shear wave velocity of the formation, (v) slow shear wave velocity of the formation(vi) dip of the formation, (vii) radioactivity of the formation, (viii) nuclear magnetic resonance characteristic of the formation, (ix) pressure of a fluid in the formation, (x) mobility of a fluid in the formation, and (xi) permeability of the formation to flow of a fluid therein.

58. The method of claim 27 further comprising using a formation fluid sampling device on the sensor assembly to obtain a sample of a fluid from the formation.

* * * * *